UNITED STATES PATENT OFFICE.

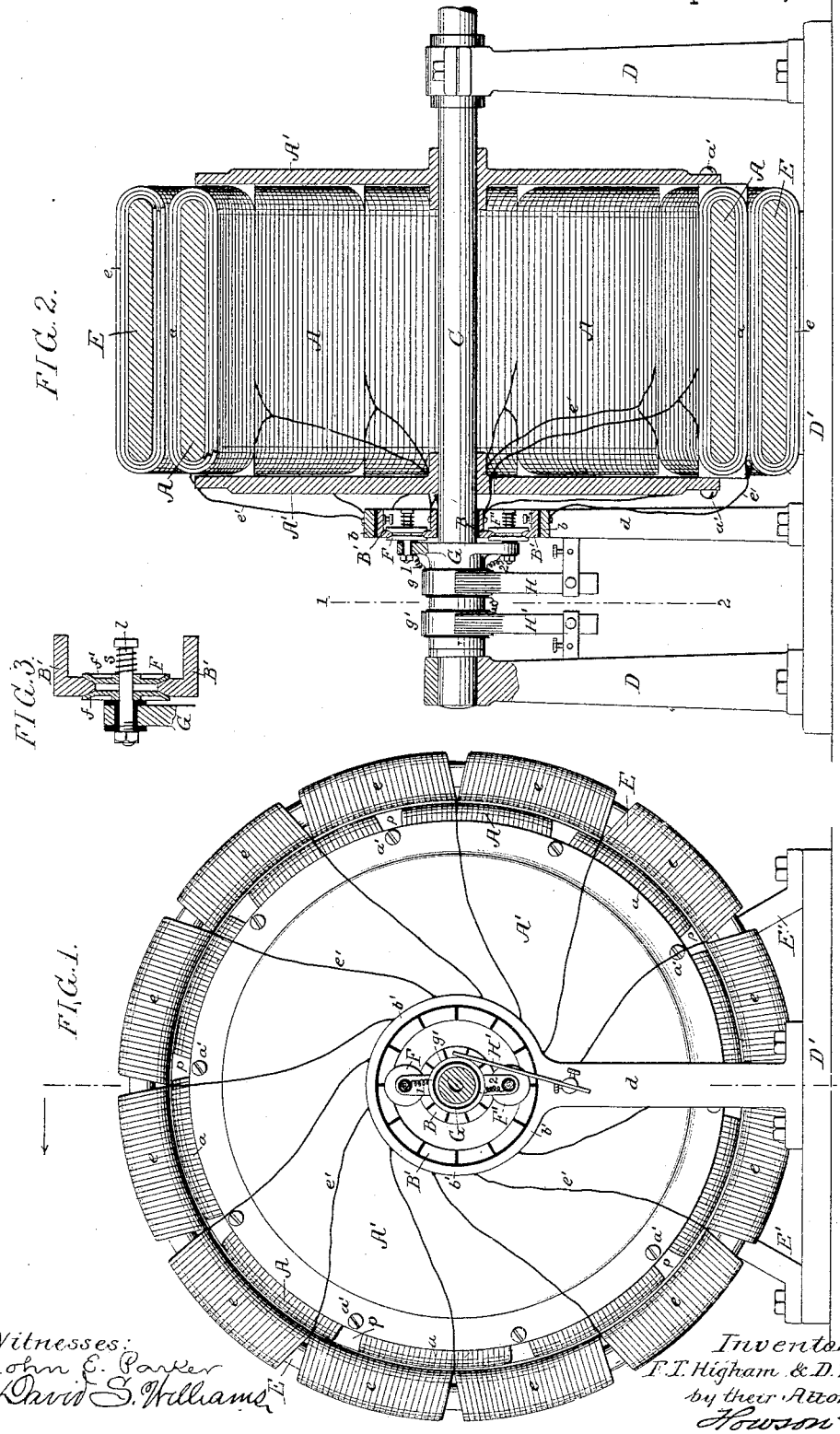

ENOS T. HIGHAM AND DANIEL HIGHAM, OF PHILADELPHIA, PA., ASSIGNORS OF ONE-THIRD TO JAMES M. JONES, OF SAME PLACE.

ELECTRIC MOTOR.

SPECIFICATION forming part of Letters Patent No. 349,715, dated September 28, 1886.

Application filed November 21, 1885. Serial No. 183,523. (No model.)

*To all whom it may concern:*

Be it known that we, ENOS T. HIGHAM and DANIEL HIGHAM, citizens of the United States, and both residing in the city of Philadelphia, Pennsylvania, have invented certain Improvements in Electric Motors and Mode of Operating the Same, of which the following is a specification.

The object of our invention is to so construct and operate an electric motor as to obtain an increased efficiency therefrom, and this object we attain as fully described hereinafter.

In the accompanying drawings, Figure 1 is a side view of an electric motor embodying our invention, the shaft being shown in section on the line 1 2, Fig. 2. Fig. 2 is a vertical section, and Fig. 3 is a view drawn to an enlarged scale of a contact-wheel for the commutators.

The machine is illustrated as composed of two electro-magnetic rings, A and E, of the Gramme type, and in the present instance the inner ring, A, is shown as the revolving element, while the outer ring, E, is fixed, being supported on the base-plate D' by suitable feet, E', or by other means. The inner revolving ring may be termed the "armature," while the other stationary ring is termed the "field-magnet," although both electro-magnetic rings are armatures, for the reason that they are both provided with commutators, as will be hereinafter seen, and either armature may be said to constitute a field-magnet in respect to the other.

The coils $a$ of the armature A have their connected terminals in electrical communication with corresponding insulated segments of the commutator B, which is carried by the armature-shaft C. In the present instance we have shown the armature-ring as mounted on two disks, A', securing-bolts $a'$ being passed through the outer edge of each disk into the pole-pieces $p$ of the ring. Those disks are secured to the horizontal shaft C, which is mounted to turn in suitable bearings in standards D D on the base-plate D'. The coils $e$ of the outer electro-magnetic ring, E, are also connected up in series, and their connected terminals are in electrical communication, through suitable conductors, $e'$, with the insulated segments of the fixed annular commutator B', which is mounted within a ring, $b$, carried by or forming a continuation of a suitable standard, $d$. The commutator B, which is carried by but insulated from the shaft C, is adapted to rotate concentrically within the annular commutator B'.

Between the two commutators, and adapted to make contact therewith, are two diagonally-opposite contact-wheels, F F', which are carried by but insulated from a sleeve, G, mounted upon the shaft C, so as to be free to rotate thereon. This sleeve carries two insulated metallic rings, $g\ g'$, with which make contact two brushes, H H', mounted on some fixed portion of the frame, the line-wires being in electrical communication with those brushes. One of these rings, $g$, is in electrical communication with the contact-wheel F through the conductor 1, while the other ring, $g'$, is in communication with the contact-wheel F' through the conductor 2.

The current coming in, say, at the brush H will pass through the contact-wheel F to the commutator-plates with which they happen to be in contact, and thence through the corresponding conductors to the coils of both the electro-magnetic rings, there splitting and passing in opposite directions through opposite halves of each ring of coils and out through the contact-wheel F' and brush H'. It will thus be seen that the traveling contacts rotate the polar points of both electro-magnetic rings in the same direction as that in which the rotary electro-magnet moves mechanically. By this mode of operation we obtain an increased efficiency from the motor.

We prefer to construct the contacts F and F' as more clearly illustrated in Fig. 3—that is to say, each wheel is composed of two disks, $f\ f'$, mounted upon a stud, $l$, one or both loose thereon, so that a spiral spring, $s$, between an enlarged head on the stud and the disk keeps the two disks together. The insulated segments of the commutators are flanged, and these flanges are adapted to enter between the pairs of disks, so that the spring $s$ will always insure contact of the disks or wheels with the segments.

We claim as our invention—

1. The mode herein described of operating an electric motor, said mode consisting in electrically rotating the polar points of both electro-magnets constituting the armature and field-magnet in the same direction as the rotary electro-magnet moves mechanically, all substantially as set forth.

2. An electric motor having a fixed and a rotary electro-magnet, constituting the field-magnet and armature, in combination with commutating devices to rotate the polar points of both electro-magnets in the same direction as that in which the rotary electro-magnet moves mechanically, substantially as set forth.

3. An electric motor having an armature and field-magnet, both provided with commutators and traveling contacts for both commutators, substantially as specified.

4. The combination of the fixed electro-magnet of an electric motor and a fixed commutator therefor with a rotary electro-magnet having a commutator moving therewith and traveling contacts for both commutators, substantially as specified.

5. The combination of the fixed and rotary electro-magnets constituting the armature and field-magnet of an electric motor, both having commutators with contacts therefor, a sleeve free to turn on the shaft of the rotary electro-magnet and carrying the said contacts, substantially as set forth.

6. The combination of a commutator having flanged segments with contact-wheels, consisting of disks between which the flanges of the segments are adapted to enter, substantially as specified.

In testimony whereof we have signed our names to this specification in the presence of two subscribing witnesses.

ENOS T. HIGHAM.
DANIEL HIGHAM.

Witnesses:
WILLIAM F. DAVIS,
HARRY SMITH.